(12) United States Patent
Horiguchi et al.

(10) Patent No.: US 10,180,533 B2
(45) Date of Patent: Jan. 15, 2019

(54) LIGHT SOURCE MODULE AND DISPLAY APPARATUS

(71) Applicant: Sakai Display Products Corporation, Sakai-shi, Osaka (JP)

(72) Inventors: Yuki Horiguchi, Sakai (JP); Takayuki Nakazawa, Sakai (JP); Tomoo Sasaki, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 97 days.

(21) Appl. No.: 14/417,753

(22) PCT Filed: Mar. 11, 2014

(86) PCT No.: PCT/JP2014/056360
§ 371 (c)(1),
(2) Date: Jan. 27, 2015

(87) PCT Pub. No.: WO2014/156618
PCT Pub. Date: Oct. 2, 2014

(65) Prior Publication Data
US 2015/0219837 A1    Aug. 6, 2015

(30) Foreign Application Priority Data
Mar. 27, 2013  (JP) ................. 2013-067119

(51) Int. Cl.
*F21V 8/00* (2006.01)
*G02F 1/1335* (2006.01)
*G02F 1/1333* (2006.01)

(52) U.S. Cl.
CPC ........... *G02B 6/0088* (2013.01); *G02B 6/009* (2013.01); *G02B 6/0068* (2013.01);
(Continued)

(58) Field of Classification Search
CPC .. G02B 6/0073; G02B 6/0085; G02B 6/0088; G02B 6/009; G02B 6/0091;
(Continued)

(56) References Cited

U.S. PATENT DOCUMENTS

| 2008/0129915 A1* | 6/2008 | Fukuda ............. G02F 1/133308 349/58 |
| 2011/0025942 A1* | 2/2011 | Lee .................... G02F 1/133615 349/58 |
| 2011/0267556 A1* | 11/2011 | Nambo ............. G02F 1/133308 349/58 |
| 2012/0063163 A1* | 3/2012 | Lai ....................... G02B 6/0031 362/602 |

(Continued)

FOREIGN PATENT DOCUMENTS

JP        2008-300170        12/2008
WO    WO2011096246 A1    8/2011

*Primary Examiner* — Zheng Song
(74) *Attorney, Agent, or Firm* — Rudy J. Ng; Bret E. Field; Bozicevic, Field & Francis LLP (57) ABSTRACT

A light source module includes a substrate on which a light source is mounted, a light guide plate having one surface configured to emit light made incident from a side surface of the light guide plate opposed to the light source, a support configured to support the substrate at an opposite surface opposed to the side surface of the light guide plate, and an attachment member configured to attach the substrate to the support, wherein the attachment member includes a latch part to be latched to the support and a holding part configured to hold the substrate between the opposite surface and the holding part, and a height of the holding part that is holding the substrate from a surface of the substrate is higher than a height of the light source from the surface of the substrate.

10 Claims, 9 Drawing Sheets

(52) U.S. Cl.
CPC ......... *G02B 6/0073* (2013.01); *G02B 6/0085* (2013.01); *G02F 1/133615* (2013.01); *G02F 2001/133317* (2013.01); *G02F 2001/133322* (2013.01); *G02F 2001/133325* (2013.01); *G02F 2001/133628* (2013.01); *G02F 2201/465* (2013.01)

(58) Field of Classification Search
CPC .. F21V 19/003; F21V 19/0035; F21V 19/004; F21V 19/0045; F21V 19/005; F21V 19/0055
USPC ............ 362/97.1–97.4, 600–634; 349/58–60
See application file for complete search history.

(56) References Cited

U.S. PATENT DOCUMENTS

| | | | |
|---|---|---|---|
| 2012/0069262 A1* | 3/2012 | Kang, II | G02F 1/133608 349/58 |
| 2012/0188485 A1* | 7/2012 | Cheon | G02B 6/0068 349/65 |
| 2012/0281151 A1* | 11/2012 | Abe | G02B 6/0091 348/739 |
| 2012/0293729 A1* | 11/2012 | Yoshikawa | G02B 6/0068 348/739 |
| 2013/0141651 A1* | 6/2013 | Kuromizu | G02B 6/0088 348/739 |
| 2013/0286556 A1* | 10/2013 | Kuo | G02F 1/133308 361/679.01 |
| 2014/0104875 A1* | 4/2014 | Yu | G02B 6/0083 362/609 |

\* cited by examiner

LIGHT GUIDE PLATE SIDE

FIG. 9

LIGHT GUIDE PLATE SIDE

LIGHT SOURCE MODULE AND DISPLAY APPARATUS

CROSS-REFERENCE TO RELATED APPLICATIONS

This application is the national phase of PCT International Application No. PCT/JP2014/56360 which has an International filing date of Mar. 11, 2014 and designated the United States of America.

FIELD

The present application relates to a light source module of an edge light system and a display apparatus including the light source module.

BACKGROUND

A liquid-crystal display apparatus referred to as a thin type, such as a liquid-crystal television, includes a display panel which has a display surface on which an image is displayed at the front side thereof formed in a substantially rectangular parallelepiped shape, and a light source module arranged at the rear side of the display panel and emitting light to the display panel.

As the light source module, a direct light type in which a diffusion plate and a support for supporting the diffusion plate are arranged at the rear side of the display panel while a cold cathode fluorescent lamp (CCFL) or a light emitting diode (LED) are arranged at the rear side of the diffusion plate, and an edge light type in which a light guide plate and a support for supporting the light guide plate are arranged at the rear side of the display panel and a light emitting diode is arranged at the side surface side of the light guide plate have generally been adopted (see Japanese Patent Laid-Open No. 2008-300170, for example).

In the light source module of the edge light type, multiple light emitting diodes are arranged to be opposed to a side surface of the light guide plate, and light made incident from the side surface of the light guide plate is output from one surface of the light guide plate while being diffused within the light guide plate. It is thus possible to reduce the thickness in the front-back direction of the display apparatus compared to the direct light type in which multiple light sources are arranged side by side on the rear side of the diffusion plate, so that the edge light type is advantageously employed in terms of making the apparatus thinner.

SUMMARY

In a light source module of the direct light type, multiple cold cathode fluorescent lamps or light emitting diodes are arranged side by side so as to be opposed to the entire surface of a diffusion plate, and thus the heat generated when the light source unit emits light is transmitted across the entire support made of a metal plate, allowing heat dissipation from the entire support.

In the light source module of the edge light type, on the other hand, a light incident efficiency decreases when a space between a light source unit and a light guide plate is large, which cannot satisfy the luminance required. Thus, it is often designed, in general, that the space between the light source unit and the light guide plate is narrow. Accordingly, the heat generated when the light source unit emits light is transmitted to the light guide plate, and the light guide plate expands by the heat from the light source unit due to high linear expansion coefficient of the light guide plate and makes contact with the light source unit, causing a problem of a possible damage in the light source unit.

The present application has been made in view of the circumstances as described above, and aims to provide a light source module that can prevent a light guide plate from being in contact with a light source even when the light guide plate expands due to heat from the light source, and a display apparatus provided with the light source module.

A light source module according to the present application includes a substrate on which a light source is mounted, a light guide plate with one surface emitting light made incident from a side surface of the light guide plate opposed to the light source, and a support for supporting the substrate at an opposite surface opposed to the side surface of the light guide plate, comprising an attachment member for attaching the substrate to the support, wherein the attachment member includes a latch part to be latched to the support and a holding part for holding the substrate between the opposite surface and the holding part, and a height of the holding part that is holding the substrate from a surface of the substrate is higher than a height of the light source from the surface of the substrate.

The light source module according to the present application is characterized in that the support includes a first plane having the opposite surface and a second plane continuing to the first plane and being opposed to another surface of the light guide plate, and the latch part includes a plurality of latch projections fitted into latch holes formed respectively at the first plane and the second plane.

The light source module according to the present application is characterized in that a portion of the holding part facing the light source is inclined to a direction in which a light emitting angle from the light source is increased.

The light source module according to the present application is characterized in that the attachment member is integrally molded with the substrate.

The light source module according to the present application is characterized in that the attachment member is molded by a white resin.

The light source module according to the present application is characterized in that the light source is a plurality of light emitting diodes linearly arranged side by side.

The light source module according to the present application is characterized in that the support is configured by a heat sink.

A display apparatus according to the present application is characterized by comprising the light source module described above and a display panel located at one surface side of a light guide plate included in the light source module.

According to the present application, a holding part is provided which protrudes more toward the side of the light guide plate than the surface of the light source. Thus, even when the heat generated from the light source when the light source is lit on is transmitted to the light guide plate and the light guide plate expands in the in-plane direction, the side surface of the light guide plate first touches the surface of the holding part, preventing the light guide plate from making contact with the light source. As a result, a damage in the light source associated with the expansion of the light guide plate can be avoided.

The above and further objects and features of the invention will more fully be apparent from the following detailed description with accompanying drawings.

DESCRIPTION OF EMBODIMENTS

A light source module according to the present application and a display apparatus provided with the light source module will specifically be described with reference to the drawings illustrating the embodiments thereof.

Embodiment 1

Figure 1:
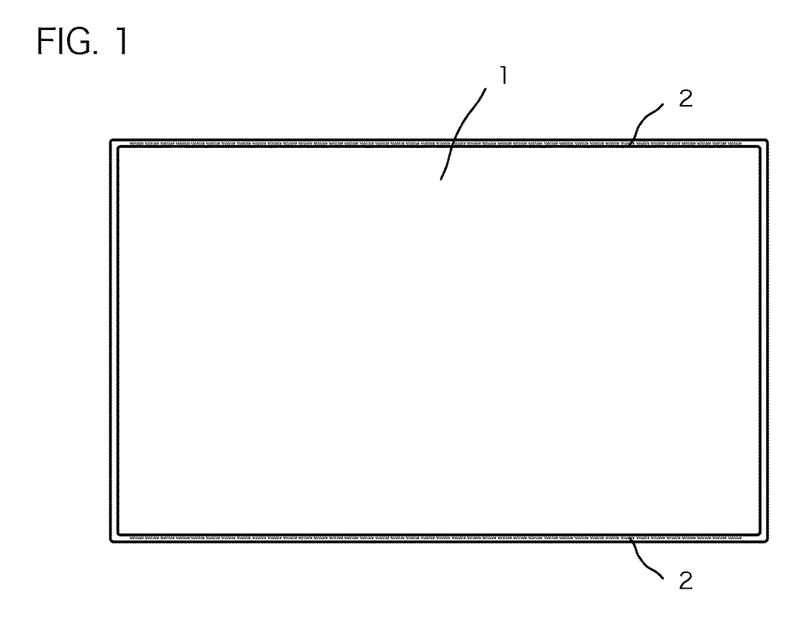
FIG. 1 is a plan view of a display apparatus according to Embodiment 1.
Figure 2:
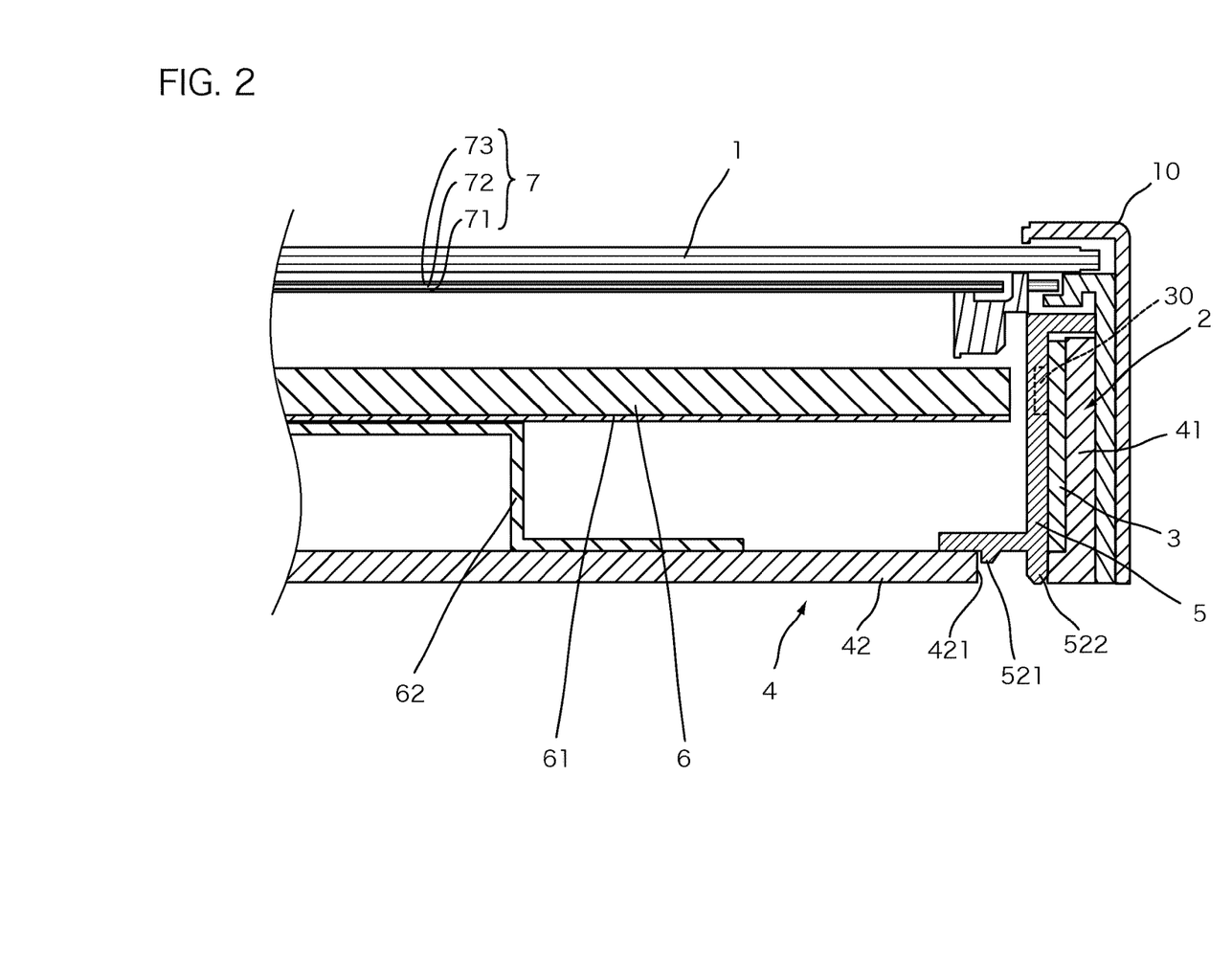
FIG. 2 is a section view of a main part of a display apparatus according to Embodiment 1.

FIG. 1 is a plan view of a display apparatus according to Embodiment 1, and FIG. 2 is a section view of a main part of a display apparatus according to Embodiment 1. In the present embodiment, a liquid-crystal display apparatus provided with a light source module of an edge light type is described as an example of the display apparatus according to the present application. The liquid-crystal display apparatus includes a liquid-crystal panel 1 having a shape of a horizontally-long rectangle, and light source modules 2, 2 arranged along the upper side and the lower side of the liquid-crystal panel 1.

It is to be noted that the light source module 2 may be located at one of the upper side and the lower side, or may be located at a left side or a right side.

The circumference of the liquid-crystal panel 1 is covered with a bezel 10, while the light source module 2 is arranged inside the bezel 10. The light source module 2 includes an LED substrate 3 in which a large number of LED chips 30, 30, 30, ... are linearly arranged, a heat spreader 4 which has a function of dissipating heat generated from the LED chips 30 and is a support for supporting the LED substrate 3, an LED guard clip 5 which is an attachment member for attaching the LED substrate 3 to the heat spreader 4, and a light guide plate 6 which receives light from the LED chip 30 on a side surface thereof, and emits the light to the front surface side (the side of the liquid-crystal panel 1).

The light guide plate 6 is made of synthetic resin such as acrylic resin or polycarbonate resin, and is formed in a substantially rectangular shape. The side surfaces of the light guide plate 6 are so oriented as to be opposed to the LED chips 30, 30, 30 ... on the LED substrate 3, while a reflection sheet 61 made of synthetic resin having high reflectivity is provided on the back surface of the light guide plate 6.

On the light guide plate 6, for example, a dot pattern is printed, which serves as a lighting element for emitting the light made incident from the side surface to the front surface side. As a lighting element, for example, a light scattering structure formed by printing, molding or the like at the back surface of the light guide plate 6, a light scattering structure formed inside the light guide plate 6, or an optical element for changing the light guiding direction may be used. The light scattered by the lighting element of the light guide plate 6 and the light reflected at the surface of the reflection sheet 61 are emitted to the side of the liquid-crystal panel 1. The light guide plate 6 and reflection sheet 61 are supported by a bottom surface part 42 of the heat spreader 4 via a BL chassis 62.

Between the light guide plate 6 and the liquid-crystal panel 1, an optical sheet 7 in which a diffusion sheet 71, a prism sheet 72 and a polarization sheet 73 are laminated is disposed. The diffusion sheet 71 is, for example, a PET film or a PC film, and has a function of diffusing the light made incident from the light guide plate 6. The prism sheet 72 is formed by shaping a regular prism pattern with acrylic resin on one surface of a sheet material made of polyester. The polarization sheet 73 is, for example, a film made of polyethylene naphthalate, and has a function of converting the light entering the liquid-crystal panel 1 into linearly-polarized light.

Figure 3:
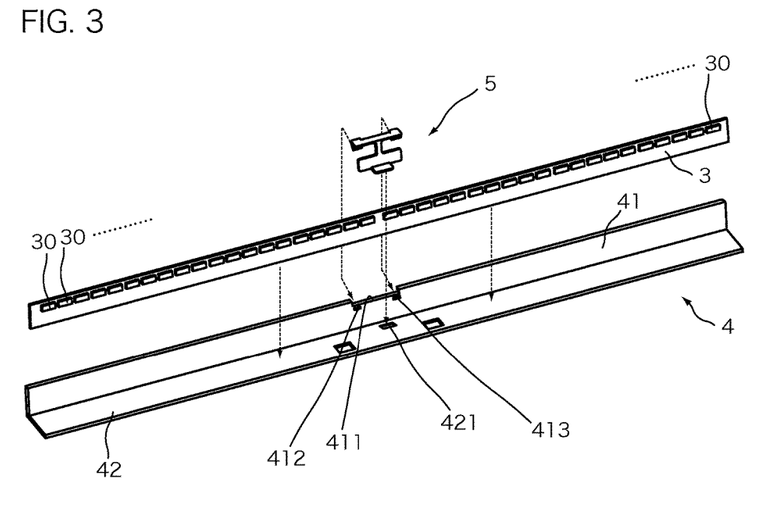
FIG. 3 is an explanatory view illustrating a method of attaching an LED substrate to a heat spreader.
Figure 4:
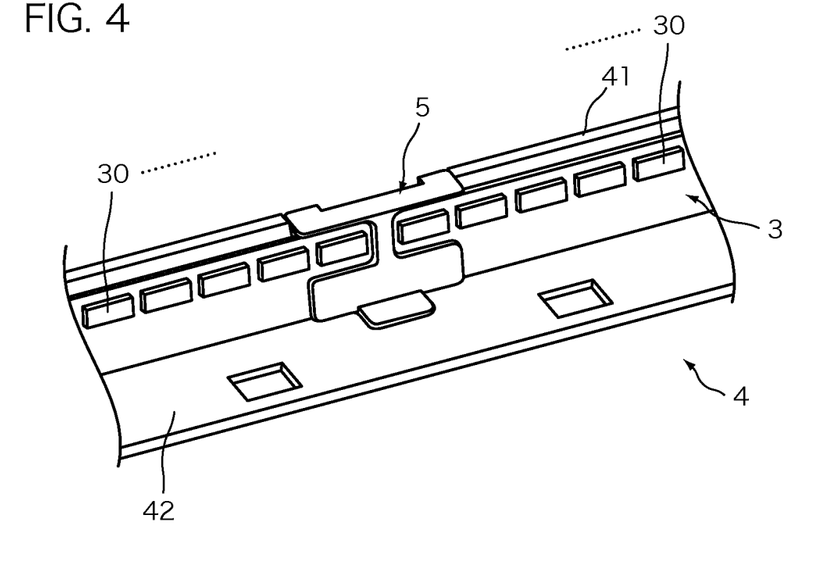
FIG. 4 is a perspective view illustrating a state where the LED substrate is attached to the heat spreader.

FIG. 3 is an explanatory view illustrating a method of attaching the LED substrate 3 to the heat spreader 4, and FIG. 4 is a perspective view illustrating a state where the LED substrate 3 is attached to the heat spreader 4. The LED substrate 3 corresponds to a horizontally-long substrate on which a large number of LED chips 30, 30, 30 ... are linearly arranged along the longitudinal direction of the substrate. The number of LED chips 30 provided on the LED substrate 3 can appropriately be designed in accordance with a size of the display apparatus and, for example, approximately seventy LED chips 30 are provided. It is to be noted that FIG. 3 illustrates an example where forty LED chips 30 are arranged due to space limitations.

One LED chip 30 has a substantially rectangular shape having a size of approximately 3 mm×5 mm when viewed from the front, and the height from the substrate surface (thickness of LED chip 30) being a height (thickness) of approximately 1 mm. The horizontal space between adjacent LED chips 30 and 30 is approximately 2 mm except for the part where the LED guard clip 5 is located. The space at the part where the LED guard clip 5 is located is approximately 4.5 mm.

The heat spreader 4 has a horizontal cross section having a substantially L shape, and is formed by a horizontally-long angle member made of metal (aluminum, for example), and is configured to dissipate the heat generated from the LED chips 30, 30, 30, ... to the outside when the LED chips 30, 30, 30, ... mounted on the LED substrate 3 are lit on. The heat spreader 4 includes a plate-like bottom surface part 42 (a second plane) which is a surface opposed to the back surface of the light guide plate 6, and a plate-like side surface part 41 (a first plane) which is formed in a vertical direction at the edge of the bottom surface part 42 along the longitudinal direction of the heat spreader 4 and is a surface opposed to the side surface of the light guide plate 6.

In the present embodiment, an LED guard clip 5 is attached near the middle part of the heat spreader 4 in the longitudinal direction. Accordingly, the heat spreader 4 includes a cutout part 411 for positioning the LED guard clip 5 at the upper end near the middle part of the side surface part 41 in the longitudinal direction as well as two latch holes 412, 413 formed at a slightly lower side of the cutout part 411, and one latch hole 421 near the middle part of the bottom surface part 42 in the longitudinal direction.

The attachment position of the LED guard clip 5 is determined by the cutout part 411 provided at the side surface part 41, and is attached to the heat spreader 4 by the two latch holes 412, 413 at the side surface part 41 and one latch hole 421 at the bottom surface part 42. Here, the LED guard clip 5 is attached to the heat spreader 4 while the back surface of the LED substrate 3 is along the side surface part 41 of the heat spreader 4, and the LED substrate 3 is held between the side surface part 41 of the heat spreader 4 and the LED guard clip 5, enabling the heat spreader 4 to support the LED substrate 3.

Figure 5:
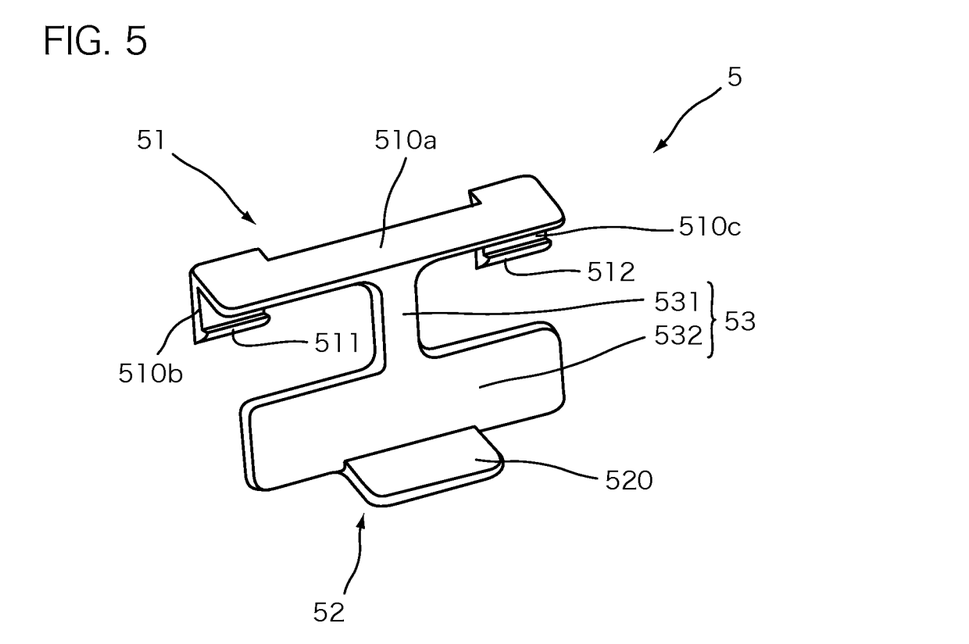
FIG. 5 is a perspective view of an LED guard clip.
Figure 6:
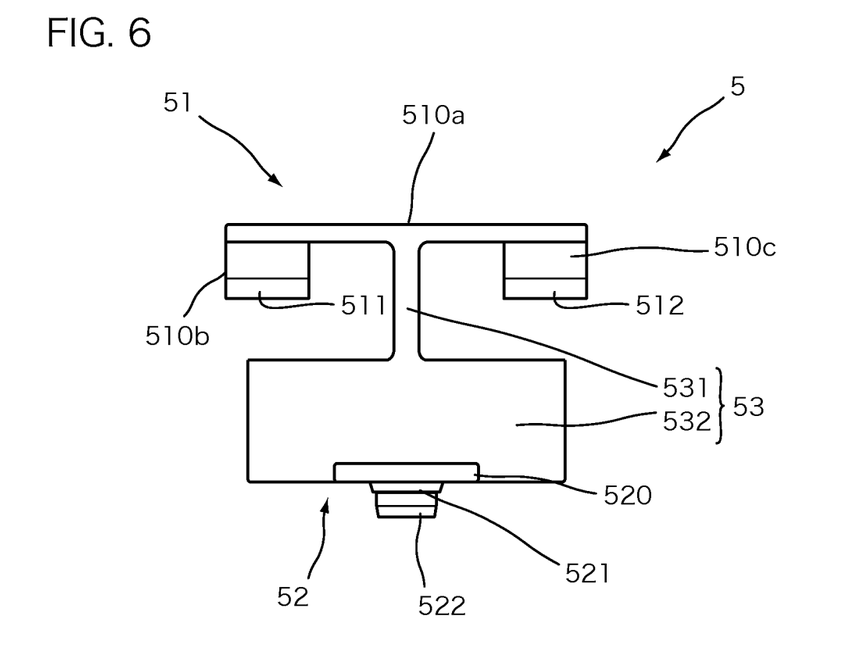
FIG. 6 is a front view of the LED guard clip.
Figure 7:
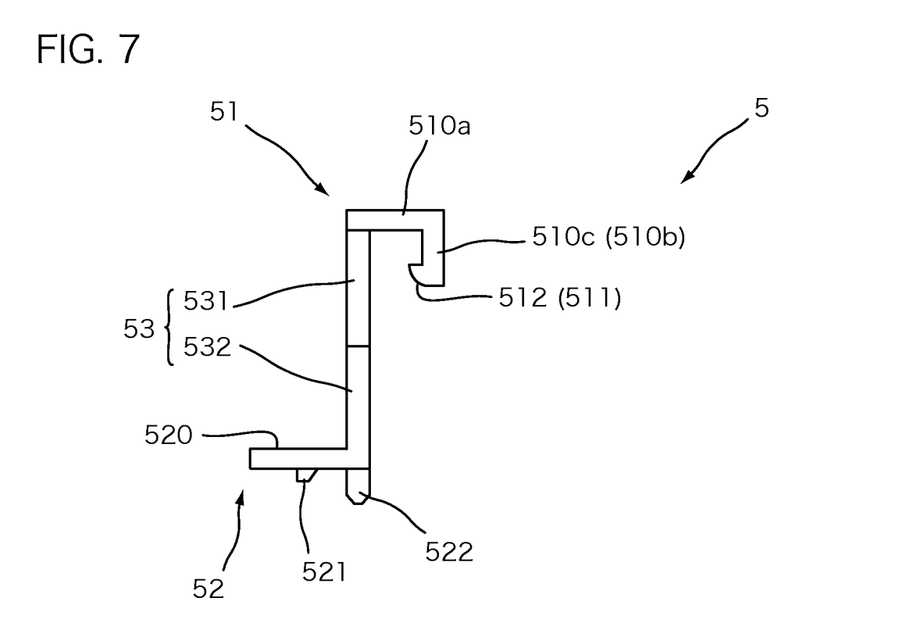
FIG. 7 is a side view of the LED guard clip.

FIG. 5 is a perspective view of the LED guard clip 5, FIG. 6 is a front view thereof, and FIG. 7 is a side view thereof. The LED guard clip 5 includes a latch part 51 on the upper surface side, a latch part 52 on the bottom surface side, and a holding part 53 continuing both to the latch part 51 and latch part 52, and is integrally formed by white resin.

The latch part 51 is configured by an upper surface member 510a extending from the upper end of the holding part 53 to the rear side, protruding pieces 510b, 510c protruding downward from two portions, respectively on the circumference of the upper surface member 510a, and latch projection parts 511, 512 protruding forward from the lower end of the protruding pieces 510b, 510c. The latch projection parts 511, 512 of the latch part 51 are so configured as to be fitted into two latch holes 412, 413 provided at the side surface part 41 of the heat spreader 4 and to be latched thereto (see FIG. 3).

The latch part 52 includes a bottom surface member 520 extending forward from the lower end of the holding part 53, and two latch projection parts 521, 522 protruding from the bottom surface of the bottom surface member 520. These latch projection parts 521, 522 are arranged in the front-back direction of the LED guard clip 5 and are so formed that the latch projection part 521 at the front side is lower than the latch projection part 522 at the rear side in the height from the bottom surface. The latch projection parts 521, 522 of the latch part 52 are so configured as to be fitted into the latch hole 421 provided on the bottom surface part 42 of the heat spreader 4 and latched thereto (see FIG. 2).

The holding part 53 of the LED guard clip 5 includes a relatively narrow LED guard part 531 which continues to the latch part 51 at the upper side thereof, and a relatively wide substrate support part 532 which continues to the latch part 52 at the lower side thereof.

The LED guard part 531 has a width of approximately 3 mm, and has a thickness of approximately 1.5 mm in the front-back direction. As described earlier, the horizontal distance between the adjacent LED chips 30 and 30 is approximately 2 mm except for the part where the LED guard clip 5 is located. Thus, the LED guard part 531 cannot be placed between any arbitrary LED chips 30 and 30, but may be placed between two LED chips 30 and 30 near the middle part where a relatively wide space (e.g., 4.5 mm) is provided.

The LED guard part 531 is located between the two LED chips 30 and 30 near the middle part, the two latch projection parts 511, 512 of the LED guard clip 5 are fitted into the latch holes 412, 413 of the heat spreader 4 from the rear surface side and are latched thereto, and the two latch projection parts 521, 522 of the LED guard clip 5 are fitted into the latch hole 421 of the heat spreader 4 and latched thereto. Thus, the LED substrate 3 can be supported while being held between the holding part 53 of the LED guard clip 5 and the side surface part 41 of the heat spreader 4. The LED guard clip 5 includes a substrate support part 532 wider in the longitudinal direction of the LED substrate 3, and therefore the LED substrate 3 can be supported while its posture being stabilized even when the LED substrate 3 is held by one portion of the middle part.

Figure 8:
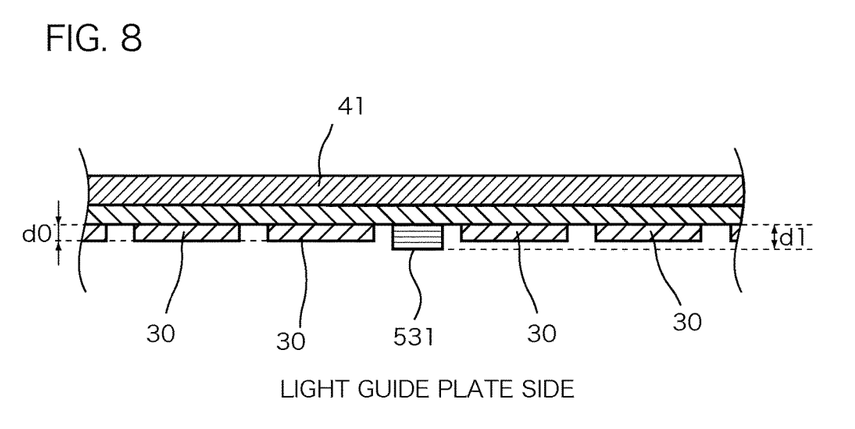
FIG. 8 is an explanatory view illustrating a relationship between the LED guard part and an LED chip.

FIG. 8 is an explanatory view illustrating a relationship between the LED guard part 531 and an LED chip 30. FIG. 8 illustrates a cross-section view of the LED guard part 531. The LED chip 30 mounted on the LED substrate 3 has a specified height d0 (e.g., approximately 1.0 mm) from the substrate surface. On the other hand, the LED guard part 531 in the LED guard clip 5 has a thickness d1 (e.g., approximately 1.5 mm) larger than d0.

That is, in the present embodiment, the height from the substrate surface of the LED guard part 531 when the LED substrate 3 is held between the heat spreader 4 and the LED guard part 531 is higher than the height of the LED 30 from the substrate surface, and the LED guard part 531 protrudes more toward the light guide plate 6 than the surface of the LED chip 30. Thus, even when the heat generated from the LED chip 30 when the LED chip 30 is lit on is transmitted to the light guide plate 6 and the light guide plate 6 expands in the in-plane direction, the light guide plate 6 touches the surface of the LED guard part 531 first, preventing the light guide plate 6 from making contact with the LED chip 30. As a result, a damage in the LED chip 30 associated with the expansion of the light guide plate 6 can be avoided.

Moreover, in the present embodiment, the LED guard clip 5 is formed with white resin, which thus can reflect the light emitted from the LED chip 30 and can prevent the shadow of the LED guard clip 5 from casting.

Furthermore, in the present embodiment, it is possible to attach the LED substrate 3 to the heat spreader 4 without screwing, and is thus unnecessary to form a hole of a size large enough for a screw in the LED substrate 3, allowing the spaces between LED chips 30 to be narrower, thereby reducing unevenness in luminance which may be caused when the spaces are larger.

Furthermore, in the present embodiment, since the LED guard clip 5 made of resin is used, it is possible to reduce the transition of heat from the LED chip 30 to the light guide plate 6.

Embodiment 2

While the cross section of the LED guard part 531 has a substantially rectangular shape in Embodiment 1, the cross section is not limited to a rectangular shape but may be, for example, a trapezoidal shape. The present embodiment describes a structure where the shape of the cross section of the LED guard part 531 has a trapezoidal shape. It is to be noted that the basic configuration of a light source module 2 and the like are exactly the same as Embodiment 1, and will therefore not be described here.

Figure 9:
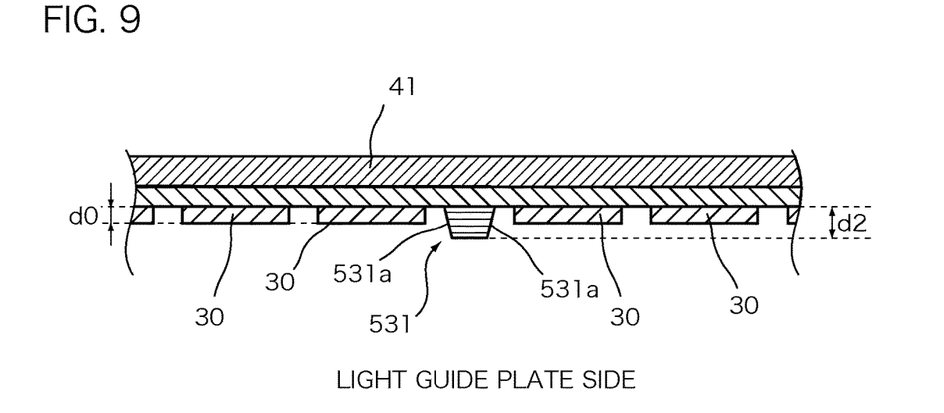
FIG. 9 is an explanatory view illustrating a relationship between an LED guard part and an LED chip according to Embodiment 2.

FIG. 9 is an explanatory view illustrating a relationship between an LED guard part 531 and an LED chip 30 according to Embodiment 2. FIG. 9 illustrates a cross section of the LED guard part 531. The LED chip 30 mounted on the LED substrate 3 has a specified height d0 (e.g., approximately 1.0 mm) from the substrate surface. On the other hand, the LED guard part 531 in the guard clip 5 has a thickness d2 (e.g., approximately 2.0 mm) which is larger than d0 and d1.

As in Embodiment 1, the LED guard part 531 is provided which protrudes more toward the light guide plate 6 than the surface of the LED chip 30. Thus, even when the heat generated from the LED chip 30 when the LED chip 30 is lit on is transmitted to the light guide plate 6 and the light guide plate 6 expands in the in-plane direction, the light guide plate 6 touches the surface of the LED guard part 531 first, thereby preventing the light guide plate 6 from making contact with the LED chip 30. In Embodiment 2, the amount of protrusion is larger compared to Embodiment 1, which can effectively suppress the expansion of the light guide plate 6 toward the side of the LED chip 30.

Furthermore, in Embodiment 2, the cross section of the LED guard part 531 is formed in a trapezoidal shape, and the portions 531a, 531a of the LED guard part 531, which face the LED 30, are inclined in a direction in which the light emitting angle from the LED 30 increases. Thus, the range of the light emitted from the LED chips 30, 30 located on both sides of the LED guard part 531 can be widened. As a result, unevenness in luminance can more effectively be alleviated near the middle part of the LED substrate 30 in the longitudinal direction where a larger space is formed between the LED chips 30 and 30.

While the configuration of the display apparatus including a light source module 2 has been described in Embodiments 1 and 2, it is to be understood that the present application can also be applied to a single illumination apparatus not including a liquid-crystal panel 1 and an optical sheet 7.

Furthermore, Embodiments 1 and 2 described the light source module 2 including more than one LED chips 30, 30, 30, . . . , the light source is not limited to the LED chip 30, but may certainly be applied to any light source other than the LED chip 30.

Moreover, though Embodiments 1 and 2 described the configuration where one LED guard clip 5 is used to attach the LED substrate 3 to the heat spreader 4, more than one LED guard clips 5 may alternatively be used to attach the LED substrate 3 to the heat spreader 4. For example, though the configuration where the LED guard clip 5 is attached to one part near the middle part of the heat spreader 4 in the longitudinal direction was described in Embodiment 1, another configuration may also be possible where the LED guard clips 5 are attached to more than one parts, such as near the middle and at both ends of the heat spreader 4 in the longitudinal direction.

While Embodiments 1 and 2 described the LED substrate 3 and the LED guard clip 5 as separate members, a configuration may also be possible where the LED guard clip 5 is formed integrally with the LED substrate 3. Here, an LED guard part may be formed near the middle of the LED substrate 3 in the longitudinal direction, and latch projection parts fitted into latch holes 412, 413 of the heat spreader 4 and latched thereto may be formed at the upper end of the LED substrate 3, whereas latch projection parts fitted into a latch hole 421 of the heat spreader 4 and latched thereto may be formed at the lower end of the LED substrate 3. The two latch protrusion parts formed at the upper end of the LED substrate 30 are fitted into the latch holes 412, 413 of the heat spreader 4 from the rear surface side and latched thereto, and the two latch projection parts formed at the lower end of the LED substrate 30 are fitted into the latch hole 421 of the heat spreader 4 to be latched thereto, whereby attachment of the LED substrate 3 to the heat spreader 4 is completed and effects similar to those described in Embodiments 1 and 2 can be obtained.

Furthermore, though Embodiment 2 described the shape of the cross section of the LED guard part 531 as a trapezoidal shape, it may also be any shape which protrudes to the side of the light guide plate 6, such as an oval shape, a triangular shape or the like.

The embodiments disclosed herein are to be regarded as illustrative in all respects and not restrictive. The scope of the invention is defined by the appended claims rather than by the description preceding them, and all changes that fall within metes and bounds of the claims, or equivalence of such metes and bounds thereof are therefore intended to be embraced by the claims. Moreover, the technical features described in the embodiments herein may be combined with one another.

The invention claimed is:

1. A light source module comprising:
    a substrate comprising a surface on which a light source is mounted;
    a light guide plate having one surface configured to emit light made incident from a side surface of the light guide plate opposed to the light source;
    a support configured to support the substrate at an opposite surface opposed to the side surface of the light guide plate; and
    an attachment member configured to attach the substrate to the support,
wherein
    the support includes (i) a first plane portion having the opposite surface and a rear surface of the opposite surface, and (ii) a second plane portion continuing to the first plane portion and being opposed to another surface of the light guide plate,
    the attachment member includes latch parts to be latched to the support and a holding part comprising a first part configured to touch the rear surface of the first plane portion, a second part configured to touch the surface of the substrate on which the light source is mounted, and a third part configured to connect the first part and the second part without penetrating the substrate and the support, wherein the holding part is configured to hold the substrate and the first plane portion by clamping them between the first part and the second par,
    the first part includes, as one of the latch parts, a first latch projection part to be latched to a first latch hole formed at the rear surface of the first plane portion,
    the first latch projection part protrudes in a direction from the rear surface of the first plane portion toward the side surface of the light guide plate, and is fitted into the first latch hole of the first plane portion and penetrates the first plane portion through the first latch hole from the rear surface to the opposite surface of the first plane portion,
    the second part includes, as another one of the latch parts, a second latch projection part to be latched to a second latch hole formed at the second plane portion, and
    the second latch projection part protrudes toward the second plane portion from a bottom surface of a bottom surface member which is provided at a lower end of the second part, and is fitted into the second latch hole of the second plane portion, and
    a height of the holding part from the surface of the substrate on which the light source is mounted is higher than a height of the light source from the surface of the substrate on which the light source is mounted.

2. The light source module according to claim 1, wherein a portion of the holding part facing the light source is inclined to a direction in which a light emitting angle from the light source is increased.

3. The light source module according to claim 1, wherein the attachment member is integrally molded with the substrate.

4. The light source module according to claim 1, wherein the attachment member is molded by a white resin.

5. The light source module according to claim 1, wherein the light source is a plurality of light emitting diodes linearly arranged side by side.

6. The light source module according to claim 1, wherein the support has heat sink properties.

7. A display apparatus comprising:
the light source module according to claim 1; and
a display panel located at one surface side of a light guide plate included in the light source module.

8. The light source module according to claim 1, wherein the support is configured to dissipate heat generated by the light source.

9. The light source module according to claim 5, wherein the first part comprises an LED guard part between adjacent light emitting diodes.

10. The light source module according to claim 9, wherein the first part further comprises a substrate support part that is wider in a longitudinal direction of the substrate than the LED guard part.

\* \* \* \* \*